(12) United States Patent
Konstantinides

(10) Patent No.: US 6,320,905 B1
(45) Date of Patent: Nov. 20, 2001

(54) POSTPROCESSING SYSTEM FOR REMOVING BLOCKING ARTIFACTS IN BLOCK-BASED CODECS

(75) Inventor: Konstantinos Konstantinides, San Jose, CA (US)

(73) Assignee: Stream Machine Company, Milpitas, CA (US)

( * ) Notice: Subject to any disclaimer, the term of this patent is extended or adjusted under 35 U.S.C. 154(b) by 0 days.

(21) Appl. No.: 09/111,827

(22) Filed: Jul. 8, 1998

(51) Int. Cl.[7] ....................................................... H04N 7/12
(52) U.S. Cl. ............................................................. 375/240.08
(58) Field of Search ........................ 375/240.01, 240.24, 375/240.26, 240.29, 240.08; H04N 7/12

(56) References Cited

U.S. PATENT DOCUMENTS 5,367,385  11/1994  Yuan .

OTHER PUBLICATIONS

Hsia, S–C., Et Al., "Efficient Postprocessor for Blocky Effect Removal Based on Transform Characteristics", IEEE Trans. on Circ. and Systems for Video Technology, vol. 7, No. 6, Dec. 1997, pp. 924–929.

Derviaux, C., Et Al., "A Postprocessing Technique for Block Effect Elimination Using a Perceptual Distortion Measure", ICASSP–97, pp. 3001–3004.

Vasconcelos, N., Et Al. "Pre and Post–Filtering for Low Bit–Rate Video Coding," ICIP 97.

Hu, J., Et Al., "Removal of Blocking and Ringing Artifacts in Transform Coded Images", ICASSP–97, pp. 2565–2568.

Lynch, W. E., "Postprocessing Transform Coded Images Using Edges", ICASSP–95, pp. 2323–2326.

Itu, ISO/IEC JTCI/SC29/WGII. MPEG4 Video Verfication Model Version 10.0, San Jose, CA. Feb. 1998.

*Primary Examiner*—Young Lee
(74) *Attorney, Agent, or Firm*—Fernandez & Associates, LLP

(57) ABSTRACT

Video signal post-processor de-blocks signal by processing block edges, particularly vertical and/or horizontal neighboring pixels. Depending on boundary condition, received signal is filtered using smoothing LPF function. Low-memory post-processor system neither requires DCT block characteristics nor blurs image edges close to block boundary.

4 Claims, 4 Drawing Sheets

1

POSTPROCESSING SYSTEM FOR REMOVING BLOCKING ARTIFACTS IN BLOCK-BASED CODECS

BACKGROUND OF INVENTION

1. Field of Invention

Invention relates to digital signal processing, particularly to electronic image post-processing of video signals to remove blocking artifacts in block-based signals.

2. Description of Background Art

Transform- and block-based coder-decoders or "codecs" are used for digital compression of still or video images (e.g., according to JPEG or MPEG industry standard data or signal format for digital image/video compression). However, when used at relatively low bit rates, such coders produce noticeable coding artifacts, such as blockiness and ringing. Both types of artifacts are undesirable and caused by attenuation of high frequency terms. With blockiness artifact, boundaries of coded blocks are visible in slow-varying regions in image or video frame. In comparison, with ringing artifact, sharp transitions or edges in image cause ringing effect in smooth areas of image. Blockiness is generally the more objectionable of the two artifacts. Although encoder modification may reduce blockiness, such approach would be unacceptable to extent modified encoder does not comply with applicable standards. Accordingly, there is need to reduce blocking artifact, particularly in MPEG-coded video streams, still-images, video conferencing applications, and other transformed-based codecs.

SUMMARY OF INVENTION

Digital video signal is de-blocked by processing vertical and/or horizontal neighboring edge pixels, particularly by applying thereto appropriate smoothing function (e.g., low-pass filter). Low-memory post-processor system neither requires DCT block characteristics nor blurs image edges close to block boundary.

DETAILED DESCRIPTION OF PREFERRED EMBODIMENT

Figure 1:
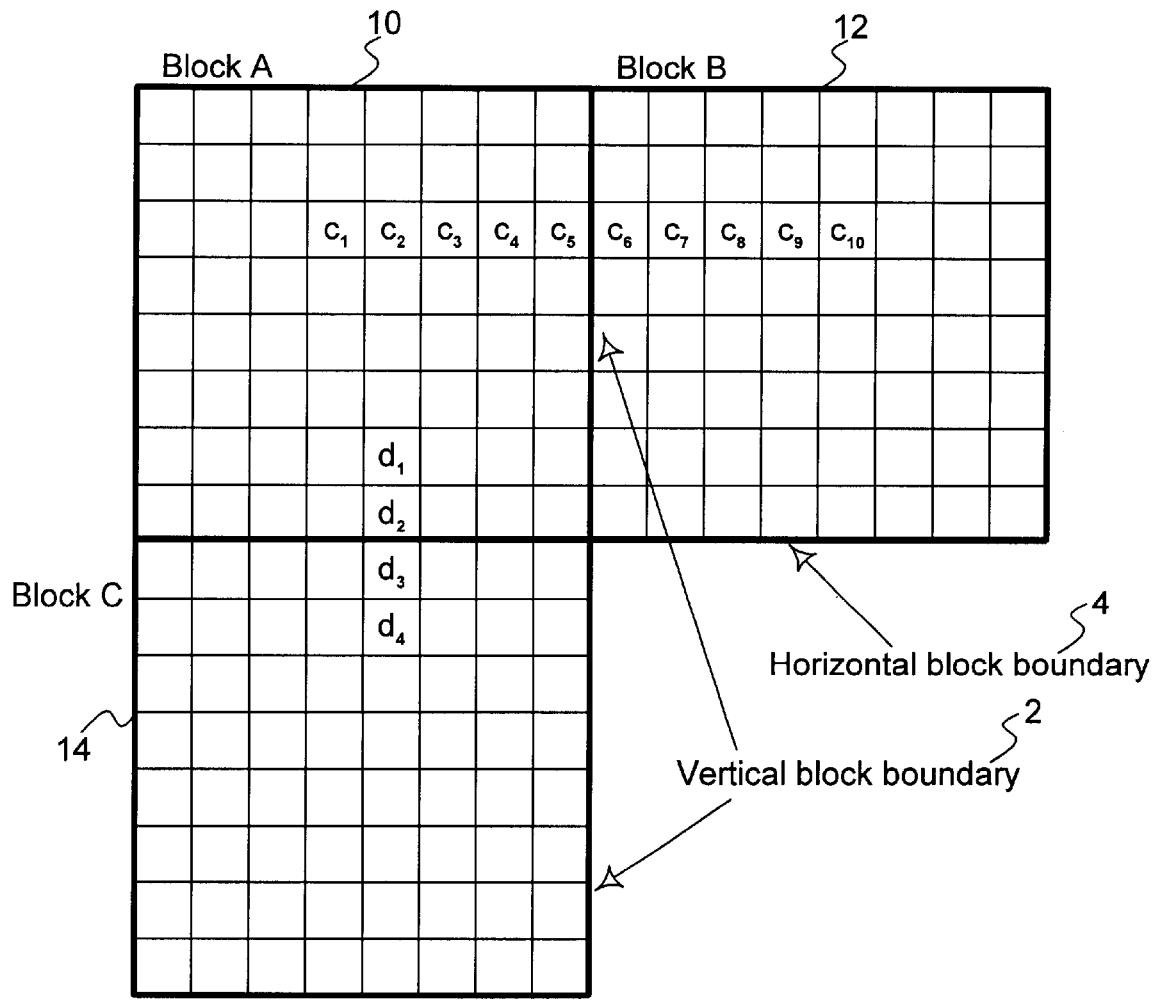
FIG. 1 is representative image blocks under deblocking operation according to present invention.

FIG. 1 shows representative image blocks A 10, B 12, and C 14 for deblocking or smoothing operation according to preferred inventive system and methodology. Preferably, such image blocks are composed, generated or otherwise assembled for electronic display using received or incoming digital compressed video and/or image bitstream signal or functionally equivalent data formatted according to one or more various known, published or online-accessible industry standard, such as Motion Picture Expert Group (MPEG) or Joint Picture Expert Group (JPEG), which specification(s) is hereby incorporated by reference.

As shown, 8×8 pixel blocks A/B 10,12 share vertical edge or block boundary 2, and 8×8 pixel blocks A/C 10, 14 share horizontal edge or block boundary 4. In particular, blocks 10, 12 include horizontally neighboring or consecutive pixels $c_1$–$c_{10}$, and blocks 10, 14 include vertically neighboring or consecutive pixels $d_1$–$d_4$, which may be processed to achieve de-blocking effectively according to present invention as described further herein.

In accordance with important aspect of present invention, digitally compressed video or image signal is received by post-processing means, whereby received signal or data may be electronically processed for de-blocking or smooth-filtering. Post-processor may be implemented using digital signal processor with dedicated data processing path or general-purpose microprocessor or controller hardware with associated firmware, microcode, software, or other equivalent functionality for accomplishing signal processing steps described herein.

Preferably, post-processor scheme determines and tracks from received input signal presence and extent of image or video block edges, particularly with respect to vertical and/or horizontal adjacent or neighboring pixels, such as $c_1$–$c_{10}$ or $d_1$–$d_4$ as shown in FIG. 1. Then, depending on determined boundary condition, received signal or corresponding pixels determined to be proximate, adjacent or relatively close to certain selected edge boundaries may be filtered using smoothing function, such as low-pass filter (LPF).

Advantageously, preferred post-processor implementation provides simpler, reduced-memory design and with higher performance, which does not require use or extraction of video or image signal characteristics, such as Discrete Cosine Transform (DCT) parameters. In addition, preferred implementation offers advantage of not causing image blurring of edges close to block boundaries.

In particular, novel deblocking scheme, as applied after decoding is directed at improving MPEG video quality, especially when encoded at rates below 4 Mbits/s. For example, novel deblocking scheme is appropriate during slow-motion play-back or still-frame display.

Figure 2:
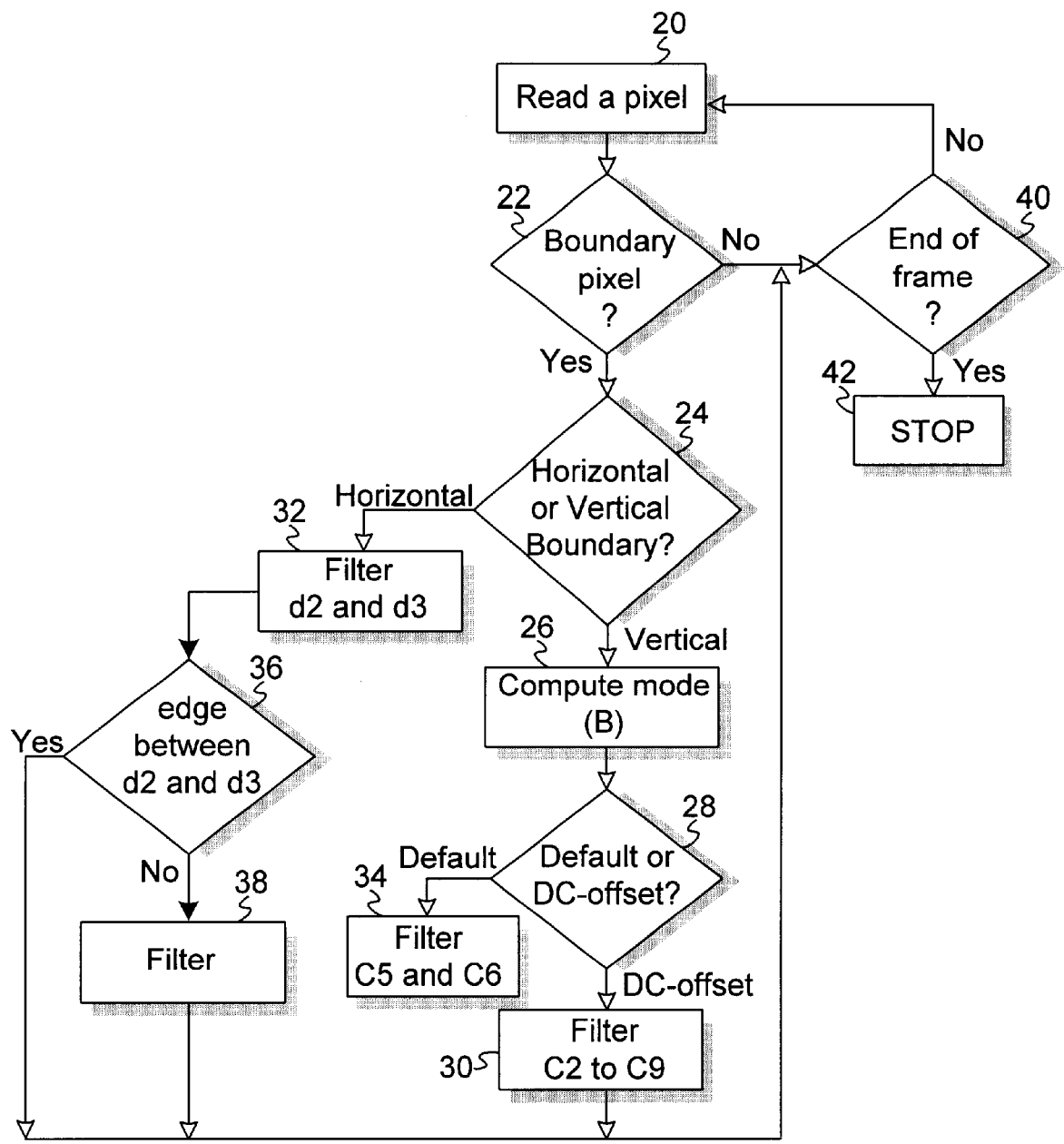
FIG. 2 is flow chart of post-processing deblocking methodology according to present invention.

FIG. 2 illustrates detailed operational steps associated with flow chart of preferred de-blocking or smoothing methodology, which is summarized as follows. Initially, input digital video or image data or signal is read in, wherein certain picture element or pixel representation is read 20 for post-processing. Then, such received pixel is processed to determine whether is ajacent or relatively proximate to block boundary or image edge 22. If pixel is not determined to be such boundary pixel, and end of frame is not determined 40, then another or next pixel is read 20; otherwise, processing is terminated 42.

When boundary pixel is recognized, then signal processing continues to determine whether such boundary pixel is associated with horizontal or vertical boundary 24. If vertical boundary is determined by signal processing 24, then particular mode is computed 26 to determine whether default or DC-offset mode 28 applies. If default mode is determined, then applicable filter scheme is applied 34 to horizontally consecutive pixels $c_5$ and $c_6$ adjacent to vertical boundary, as shown in FIG. 1, for example. If DC-offset mode is determined, then horizontally consecutive pixel range $c_2$–$c_9$ are filtered accordingly 30.

If horizontal boundary is determined by signal processing 24, then horizontally consecutive pixels $d_2$ and $d_3$ adjacent to horizontal boundary, as shown in FIG. 1, are filtered appropriately 32. Moreover, if no horizontal edge is determined 36 between horizontally consecutive pixels $d_2$ and $d_3$, then appropriate filtering scheme is applied 38 thereto.

After such foregoing filtering schemes, as shown in FIG. 2, end of frame is checked 40 prior to reading next pixel 20. Preferably, applicable filtering scheme provides smoothing function, such as low-pass filter. Moreover, such deblocking scheme, which illustrates flow steps for processing single color plane of frame, may be applied and repeated for multiple color planes in frame and multiple frames in video or image sequence.

Figure 3A:
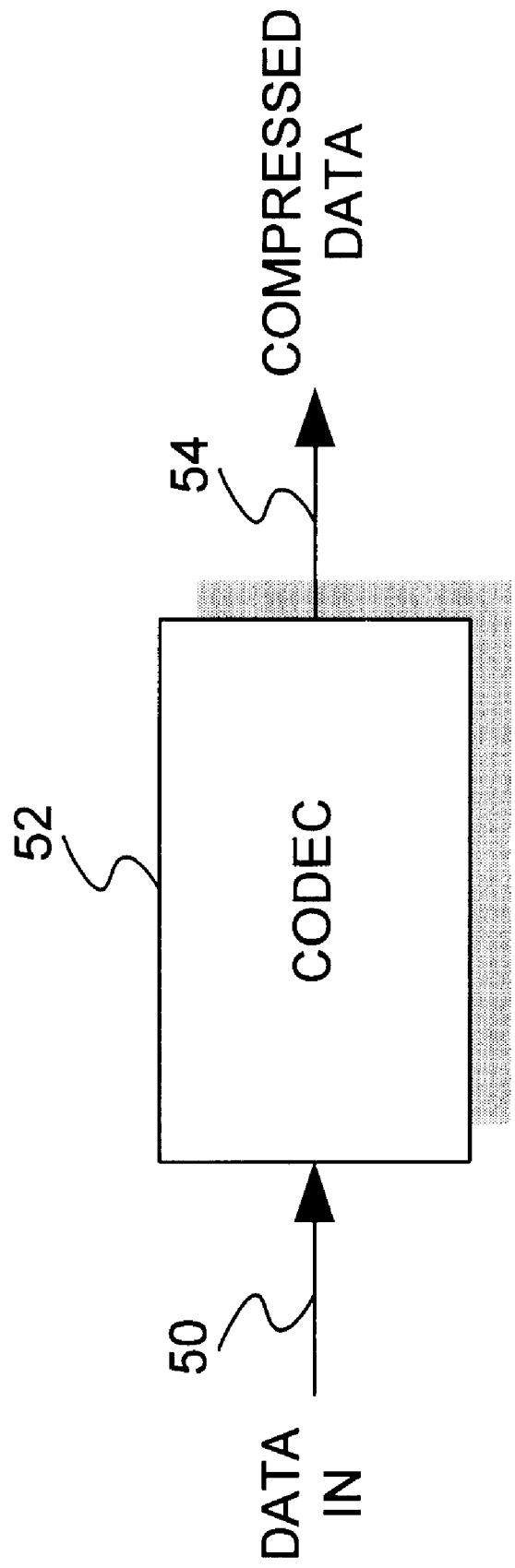
FIGS. 3A, 3B are simplified diagram of codec and decoder/post-processor for implementing present invention.
Figure 3B:
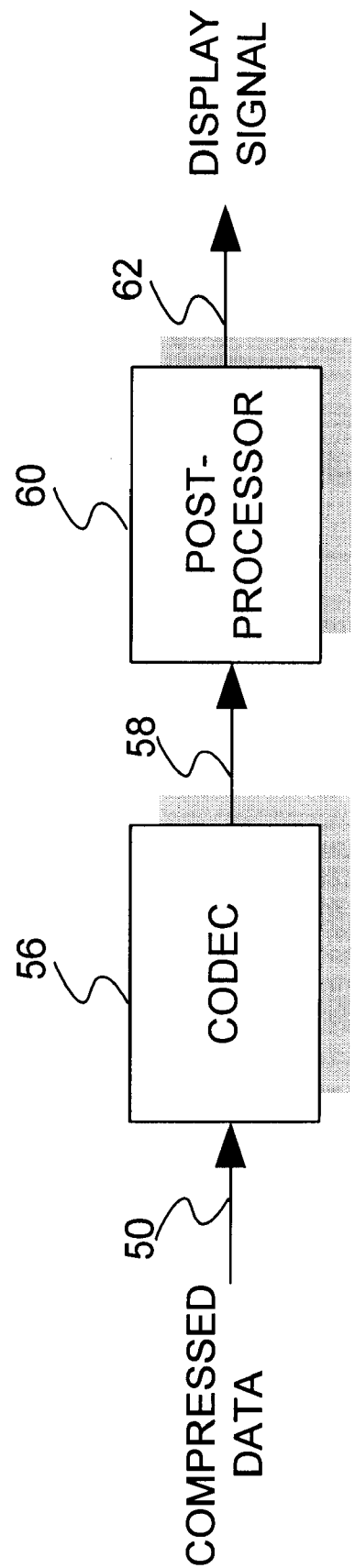

FIGS. 3A, 3B illustrate overall system for processing digitally compressed video or other image information or signal. Initially, (FIG. 3A) video or image data or signal 50 is received for processing by codec 52 to generate compressed data 54, which is formatted according to industry standard format, such as JPEG, MPEG, or other accepted protocol. Then, (FIG. 3B) compressed data 54 is received for decoding 56 to generate decoded signal 58 according to such appropriate industry standard format.

Hence, in accordance with present invention decoded signal 58 is received for transformation by post-processor 60 appropriately to achieve de-blocking or smoothing effect.

Generally to reduce blockiness, present inventive object aims to perform digital signal filtering across horizontal and/or vertical block boundaries under determined conditions when visually strong or sharp edges are not detected with certain pixels evaluated adjacent or proximate to such block edge or image boundaries. In this regard, preferred implementation employs simple edge detection and filtering schemes. Moreover, such implementation may distinguish applicable filtering scheme applied across vertical block boundaries as opposed to horizontal block boundaries.

Preferred horizontal processing scheme includes filtering two neighboring or consecutive pixels across horizontal boundary of two adjacent blocks. In FIG. 1 block image, for example, image area between blocks 10, 14, particularly pixels $d_1$ to $d_4$, may be subject for de-blocking. Accordingly in preferred implementation, pixels $d_2$ and $d_3$ are processed and filtered.

Present preferential approach to pixel filtering is taken innovatively because significant portion of original content is interlaced format, wherein each video or image frame comprises two interlaced fields. Additionally, since time delay, such as 1/60 second, occurs between two interlaced fields, pixel lines across horizontal boundaries are likely to be less smooth than pixel lines across vertical boundaries. Hence, pixels $d_2$ and $d_3$ only are filtered, effectively without blurring original image.

Furthermore, such innovative approach is taken in consideration of MPEG-2 standard specifying that macroblocks are DCT-coded in either frame or field mode. In particular, in frame mode, both vertical and horizontal boundaries of DCT blocks coincide with vertical and horizontal boundaries of spatial blocks; but, in field mode, only vertical boundaries of DCT blocks coincide with vertical boundaries of spatial blocks. Because DCT mode or associated image characteristic or signal is not typically available at postprocessor stage, present approach filters only two pixels across horizontal block boundaries.

For further illustration, following representative formula provide calculation for determining filtered signal values $d'_2$ and $d'_3$ with respect to pixel signal values:

if $(|d_2-d_3|<t_1)$ then
  $d'_2=(d_1+2d_2+d_3)/4$,
  $d'_3=(d_2+2d_3+d_4)/4$, where $t_1$ is integer threshold for determining edge presence between pixels $d_2$ and $d_3$. In sample implementation, $t_1=12$.

Moreover, to reduce blurring across block boundaries, filtered pixel signal values may be bounded by average of $d_2$ and $d_3$ as follows:

Let $d_a=(d_2+d_3)/2$.
For i=2 and i=3
  if $(d'_i>d_a)$ then
  $d'_i=d_a$

Additionally, to achieve filtering across vertical block boundaries, two modes may apply generally: default mode and DC-offset mode. Referring to FIG. 1, for example, upon deblocking vertical boundary or block edge area between blocks 10, 12, pixels $c_1$–$c_{10}$ may be selected and determined as disposed across vertical block boundary. Filtering mode is selected appropriately as default or DC-offset mode, for example, as follows:

Let $f(x-y)=1$, if $|x-y|<=t_2$, and 0 otherwise,
  where $t_2$ is another threshold.

$$\text{Let } B = \sum_{i=1}^{9} f(c_i - c_{i+1}).$$

if $(B>t_3)$ then
  apply DC-offset mode
else
  apply default mode

In preferred implementation, $t_2=2$ and $t_3=7$.

In default mode, deblocking is performed as for horizontal block boundary processing:

Let $c_a=(c_5+c_6)/2$ (average of $c_5$ and $c_6$)
Let $c'_5$ and $c'_6$ be filtered values of $c_5$ and $c_6$ respectively
Signal values are determined as follows:
  if $(|c_5-c_6|<t_1)$then
  $c'_5=(c_4+2c_5+c_6)/4$,
  $c'_6=(c_5+2c_6+c_7)/4$.
For i=5 and i=6
  if $(c'_i>c_a)$ then
  $c'_i=c_a$ In DC-offset mode, same filter as in Default mode is used; although appropriate filter is applied to all pixels from $c_2$ to $c_9$, as follows:

For i=2 to i=9
  $c'_9=(c_{i-1}+2c_i+c_{i+1})/4$

Foregoing described embodiments of invention are provided as illustration and description. It is not intended to limit invention to precise form described. Such described specification contemplates inventive functionality which may be equivalently implemented in software, firmware, hardware, and/or other functionally comparable electronic mechanism available to one of ordinary skill in the art. Other variations and embodiments are possible in light of above teaching, and it is thus intended that scope of invention not be limited by detailed description, but rather by claims as follow.

What is claimed is:

1. Method for processing digital video signal comprising steps of:

receiving a digital video signal representing a digitally compressed video image comprising a plurality of pixels arranged horizontally and vertically in a two-dimensional array;

determining a boundary condition in the received signal in a horizontal direction or a vertical direction, the boundary condition being determined in the digitally compressed video image according to a smoothness measurement associated with a plurality of pixels arranged consecutively in the horizontal or vertical direction; and modifying the received signal according to the determined boundary condition by applying a smoothing function to the received signal to generate a modified video signal;

wherein the boundary condition in the horizontal direction is determined, such that the modified video signal is generated according substantially to the following:

if $(|d_2-d_3|<t_1)$ then
$d'_2=(d_1+2\ d_2+d_3)/4$,
$d'_3=(d_2+2\ d_3+d_4)/4$, where $d_1$ to $d_4$ comprise a set of sequential pixel values in vertically neighboring image blocks represented in the processed video signal, and $d'_2$ and $d'_3$ comprise filtered values of $d_2$ and $d_3$ respectively, and $t_1$ comprises an integer threshold for determining an edge presence between the pixel values $d_2$ and $d_3$.

2. Method of claim 1 wherein:
the filtered pixel values $d'_2$ and $d'_3$ are bounded by an average of $d_2$ and $d_3$, thereby effectively reducing blurring across vertically neighboring block boundaries in the modified video signal.

3. Method for processing digital video signal comprising steps of:

receiving a digital video signal representing a digitally compressed video image comprising a plurality of pixels arranged horizontally and vertically in a two-dimensional array;

determining a boundary condition in the received signal in a horizontal direction or a vertical direction, the boundary condition being determined in the digitally compressed video image according to a smoothness measurement associated with a plurality of pixels arranged consecutively in the horizontal or vertical direction; and modifying the received signal according to the determined boundary condition by applying a smoothing function to the received signal to generate a modified video signal;

wherein a default mode or a DC-offset mode is selected, thereby effectively achieving filtering across vertical block boundaries in the modified video signal;

wherein the boundary condition in the vertical direction is determined, such that a default or DC-offset mode is selected, and the modified video signal is generated according substantially to the following:

let $f(x-y)=1$, if $|x-y|<=t_2$, and 0 otherwise, $$\text{let } B = \sum_{i=1}^{9} f(c_i - c_{i+1})$$

if $(B>t_3)$ then
apply the DC-offset mode
else
apply the default mode, where f comprises a function having variables x and y, B comprises a variable value, $t_2$ and $t_3$ comprise threshold values, and $c_i$ and $c_{i+1}$ comprise a set of sequential pixel values in horizontally-neighboring image blocks represented in the processed video signal; and wherein the default mode is applied according substantially to the following:

let $C_a=(c_5+c_6)/2$;
if$(|c_5-c_6|<t_1)$ then
$c'_5=(c_4+2c_5+c_6)/4$,
$c'_6=(c_5+2c_6+c_7)/4$;
for i=5 and i=6
if $(c'_{i>ca})$ then
$c'_i=c_a$, where $c_a$ comprises an average pixel value, $c_4$ to $c_7$ comprise a set of sequential pixel values in horizontally neighboring image blocks represented in the processed video signal, and $c'_5$ and $c'_6$ comprise filtered values of $c_5$ and $c_6$ respectively.

4. Method for processing digital video signal comprising steps of:

receiving a digital video signal representing a digitally compressed video image comprising a plurality of pixels arranged horizontally and vertically in a two-dimensional array;

determining a boundary condition in the received signal in a horizontal direction or a vertical direction, the boundary condition being determined in the digitally compressed video image according to a smoothness measurement associated with a plurality of pixels arranged consecutively in the horizontal or vertical direction; and modifying the received signal according to the determined boundary condition by applying a smoothing function to the received signal to generate a modified video signal;

wherein a default mode or a DC-offset mode is selected, thereby effectively achieving filtering across vertical block boundaries in the modified video signal;

wherein the boundary condition in the vertical direction is determined, such that a default or DC-offset mode is selected, and the modified video signal is generated according substantially to the following:

let $f(x-y)=1$, if $|x-y|<=t_2$, and 0 otherwise, $$\text{let } B = \sum_{i=1}^{9} f(c_i - c_{i+1})$$

if $(B>t_3)$ then apply the DC-offset mode
else
apply the default mode, where f comprises a function having variables x and y, B comprises a variable value, $t_2$ and $t_3$ comprise threshold values, and $c_i$ and $C_{i+1}$ comprise a set of sequential pixel values in horizontally-neighboring image blocks represented in the processed video signal;

wherein the DC-offset mode is applied according substantially to the following:
for i=2 to i=9
$c'_i=(c_{i-1}+2c_i+c_{i+1})/4$,
where $c'_i$ comprises a filtered value of $c_i$ value.

* * * * *